United States Patent [19]

Schneider et al.

[11] Patent Number: 4,755,416

[45] Date of Patent: Jul. 5, 1988

[54] PROCESS FOR CONSTRUCTING A STRUCTURAL ELEMENT THAT ABSORBS AIRBORNE SOUND

[75] Inventors: Alfred Schneider, Zurich; Hans R. Tschudi, Monchaltdorf, both of Switzerland

[73] Assignee: Matec Holding AG, Kusnacht, Switzerland

[21] Appl. No.: 49,179

[22] Filed: May 13, 1987

[30] Foreign Application Priority Data

May 16, 1986 [CH] Switzerland ........................ 2006/86

[51] Int. Cl.[4] ............................ B32B 3/24; B32B 5/32

[52] U.S. Cl. .................................... 428/167; 428/163; 428/172; 244/1 N

[58] Field of Search ................ 244/1 N; 428/156–172, 428/174

[56] References Cited

U.S. PATENT DOCUMENTS 2,069,413 2/1937 Leadbetter ...................... 428/172 X
3,026,224 3/1962 Rogers, Jr. .......................... 428/167
3,050,426 8/1962 Stevens .............................. 428/172
3,231,454 1/1966 Williams ......................... 428/174 X
4,097,633 6/1978 Focht .............................. 428/167 X
4,482,592 11/1984 Kramer ........................... 428/172 X
4,531,609 7/1985 Wolf et al. ....................... 428/163 X
4,555,433 11/1985 Jablonka et al. ................ 428/172 X

FOREIGN PATENT DOCUMENTS 2753041 6/1979 Fed. Rep. of Germany .
626936 12/1981 Switzerland .

*Primary Examiner*—Nancy A. B. Swisher
*Attorney, Agent, or Firm*—Mason, Fenwick & Lawrence

[57] ABSTRACT

The process makes it possible to determine for sound-absorbing structural elements made of a compact or foamed plastic with cup-shaped protuberances, the thickness and area size of the resonance surfaces that is required for an optimal sound aborption, as a function of the height of the protuberances and the endeavored resonance frequency.

The use of this process also makes it possible to adapt the frequency response curve of the sound absorption coefficient of the structural element to the frequency response curve of the sound level of a noise source.

12 Claims, 3 Drawing Sheets

PROCESS FOR CONSTRUCTING A STRUCTURAL ELEMENT THAT ABSORBS AIRBORNE SOUND

Figure 1A:
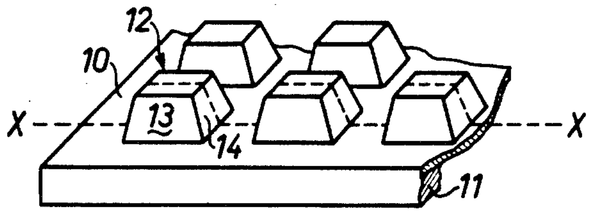

The present invention relates to a process for constructing a structural element that absorbs airborne sound and has a plurality of cup-shaped protuberances, the surfaces of which are excited by the impinging sound energy to perform oscillations, said sound energy being at least partially absorbed and changed into heat, as well as to a structural element that is constructed according to said process and to a preferred use of said structural element.

Structural elements of the described type are normally constructed of a plastic film. They have a dense surface, a small mass and are resistant to most acids, oils, solvents as well as to relatively high temperatures and are therefore preferably used for the absorption of airborne noise in noisy workshops and for the lining of the housings of noise sources, particularly of internal-combustion engines.

The best-known embodiments of structural elements of this type can be assigned to two different groups. In the case of one group (DE-OS No. 27 58 041), the openings of the protuberances on the rear side, i.e., those facing away from the impinging sound field, are closed so that the mass of the oscillating cover surface with the enclosed air forms a physical mass-spring system with a clear resonance frequency. In the case of the other group (CH No. 626 936), the rear-side openings of the protuberances are not closed.

During usage, the structural elements of both groups are preferably arranged in front of a sound-reflecting wall and at a distance from it.

In the publications that concern the embodiments of these two groups of structural elements, it is mentioned that the resonance frequency of the cover or resonance surface depends on the shape, the size and the mass of this surface, on the height of the protuberance as well as on the mechanical dissipation factor and the modulus of elasticity of the used material. In this respect, practical experience has confirmed that even relatively small differences of the dimensions of the protuberances considerably impair the course as well as the sound absorption as a function of the frequency of the impinging sound as well as the intensity of the sound absorption. Despite these findings, no process has become known up to now for constructing structural elements of this type that makes it possible to optimize the shape and dimensions of the resonance surfaces while taking into account the characteristics of the material for an indicated use.

When sound-absorbing structural elements are used in direct proximity of a sound source, the maximally permissible height of the protuberances is often indicated by the shape and dimensions of the sound source or its covering and is usually smaller than in the case of the above-mentioned known embodiments. The present invention was therefore based on the objective of providing a process that permits the constructing of structural elements that absorb airborne sound and have optimal absorption characteristics as a function of the permissible height of the protuberances.

Based on the consideration that the sound absorption of an oscillatory system consisting of flexurally oscillating surfaces and an air layer located behind them is the highest when the resonance frequency $f_0$ is real and approximately equal to the specific impedance $Z_0$ of the air, theoretical and experimental investigations were carried out in order to provide a process for constructing a sound-absorbing structural element where the sound absorption is optimized for an area of the height of the protuberances that corresponds to practical requirements and in the area of the resonance frequency has only a low dependance on frequency.

This objective was achieved by means of a process of the initially mentioned type, where for an optimal sound absorption by resonant vibrations, the thickness d of the resonance surfaces is developed corresponding to the formula $$3 \cdot \left( \frac{K_1}{f_0} + \frac{K_2}{f_0^2 h} \right) \leq 4 \cdot d \leq 5 \cdot \left( \frac{K_1}{f_0} + \frac{K_2}{f_0^2 h} \right)$$

and the surface size A of each resonance surface is developed corresponding to the formula $$A = K_3 \cdot \frac{d}{f_0} \cdot \sqrt{1 + q}\ ;\ mit\ q = \frac{1}{f_0 h} \cdot \frac{K_2}{K_1}$$

in which formula h is the height of the protuberances or the distance from a sound-reflecting wall and $f_0$ is the resonance frequency and $K_1$, $K_2$ and $K_3$ are constant values that depend on the material of the structural element and on the form of the oscillation of the resonance surface.

In the following, those oscillations are indicated to be oscillatory form s=1 that, in the longitudinal section through a resonance surface fastened at their lateral edges have only one loop of oscillation; those oscillations are indicated to be oscillatory form s=2 that in the same longitudinal section have three loops of oscillation (and between those, two oscillation nodes).

Numerical values for the constants $K_1$, $K_2$ and $K_3$ for two customary different materials and the two oscillatory forms s=1 and s=2 are indicated in the following table:

| Material | Constant | Oscillatory Form s = 1 | Oscillatory Form s = 2 |
|---|---|---|---|
| Compact PVC-Foil | $K_1$ ($ms^{-1}$) | 1,1 | 0,12 |
| | $K_2$ ($m^2s^{-2}$) | 1,6 | 0,17 |
| | $K_3$ ($ms^{-1}$) | $4,7.10^3$ | $2,2.10^4$ |
| Foamed PP-Foil | $K_1$ ($ms^{-1}$) | 3,2 | 0,3 |
| | $K_2$ ($m^2s^{-2}$) | 70,6 | 7,5 |
| | $K_3$ ($ms^{-1}$) | $1,6.10^3$ | $7,5.10^3$ |

The process according to the invention makes it possible to develop the values that are important for an effective sound absorption by resonance vibrations, namely the thickness and the size of the resonance surface, as a function of the height of the protuberance and thus systematically and reproduceably realize values of sound absorption that up to know have not been reached or were reached at best accidentally.

In the following, the process according to the invention is explained by means of several embodiments of structural elements that absorb airborne sound and by means of the figures.

Figure 1B:
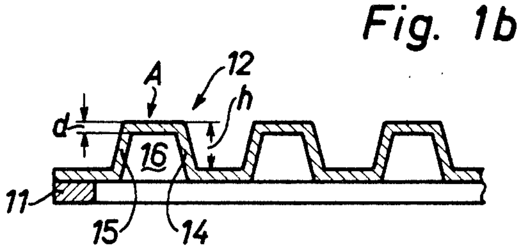
Figure 2B:
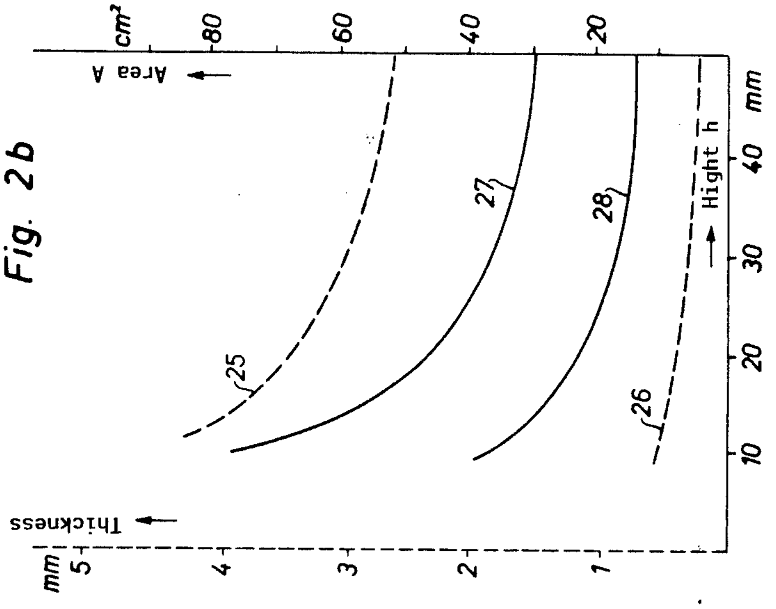
Figure 2A:
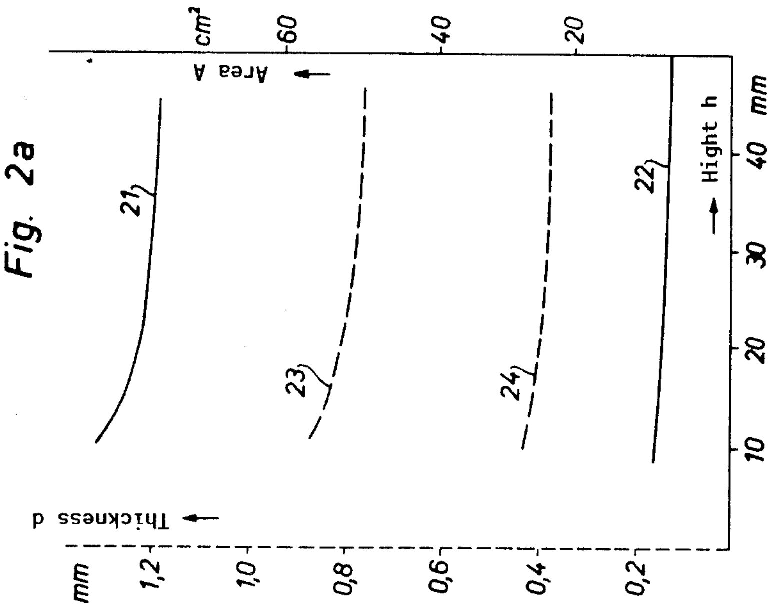
Figure 3:
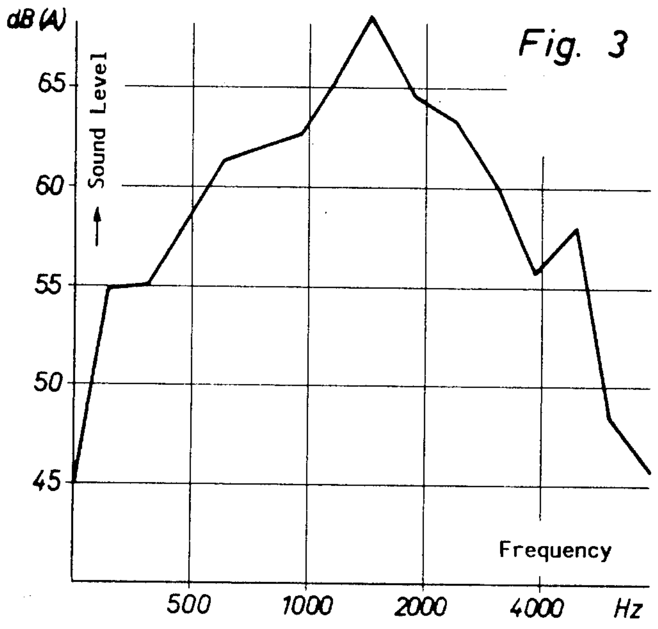
Figure 4:
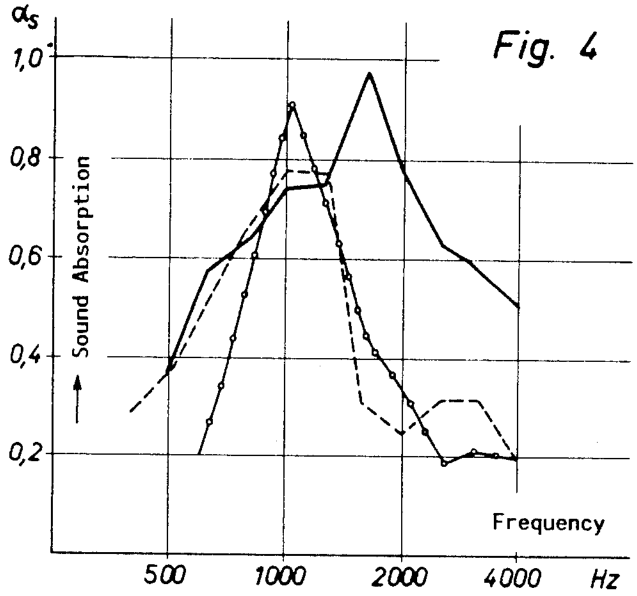
Figure 2B:
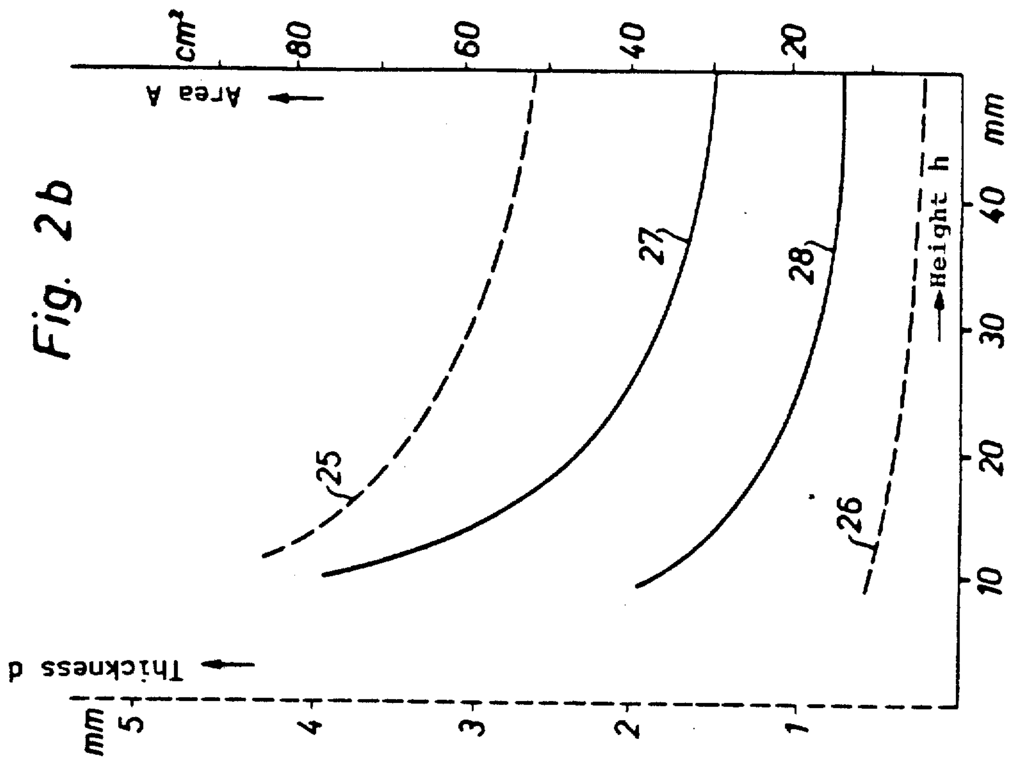
Figure 2A:
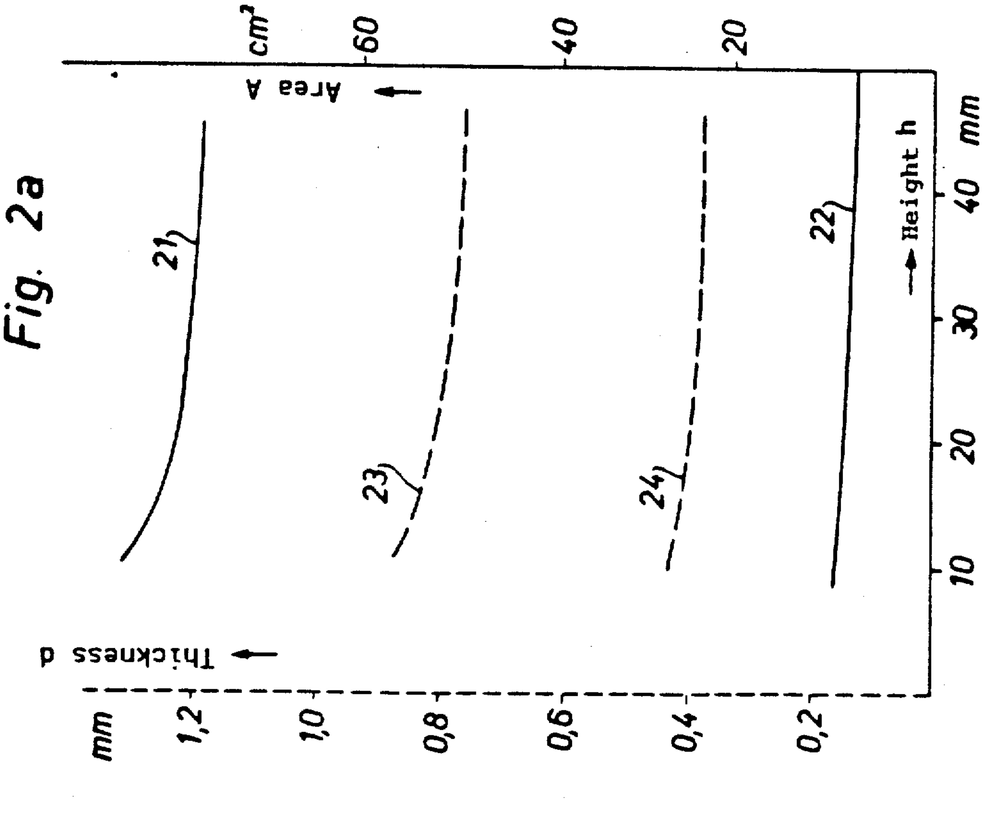

FIG. 1*a* is a perspective top view of a part of a typical structural element having truncated-pyramid-shaped protuberances that is suitable for the absorption of airborne sound;

FIG. 1*b* is a section through the structural element shown in FIG. 1*a* along Line X—X;

FIG. 2*a* is the graphic representation of the values determined according to the invention for the optimal thickness d and the optimal size A of a resonance surface made of a compact PVC-foil as a function of the height h of the protuberance and for a resonance frequency of $f_0=1,000$ c/s;

FIG. 2*b* is the representation that is analogous to FIG. 2*a* for a resonance surface made of a foamed polypropylene foil and for a resonance frequency of $f_0=1,600$ c/s;

FIG. 3 is the course of the sound level of the noise generated by an internal-combustion engine as a function of the frequency; and FIG. 4 shows the sound-absorption coefficients for a structural element of the previuosly known type and for two structural elements according to the invention, also as a function of the frequency.

For reasons of a clearer representation, FIGS. 1*b* and 1*b* do not correspond to the scale.

The airborne-sound absorbing structural element shown in FIGS. 1*a* and 1*b* contains a base area 10 the surrounding edge of which is provided with a stabilizing frame 11. The base area has a plurality of identical truncated-pyramid-shaped protuberances, of which, for reasons of simplicity, only protuberance 12 is identified by a reference number. Each protuberance has four lateral surfaces 13, 14, 15 and 16 and one cover surface 17. Quantities of the protuberances that are important for the present invention are their height h as well as the thickness d and the size A of the cover surface that acts as the determining resonance surface. Sound absorption measurements have shown that the horizontal distance between adjacent protuberances and the angle of inclination of the lateral walls with respect to the base area have little influence on the course of the sound absorption coefficient as a function of the frequency. For the purpose of obtaining a total sound absorption that is as high as possible, the protuberances must therefore preferably be developed to be so closely adjacent and the lateral walls must be developed with so little inclination as is permitted by the construction process and the practical requirements.

For the construction of the structural element, a plastic foil can simply be swaged. However, it is also possible to make the structural element by injection molding or to glue or weld protuberances formed by individual partial areas that are connected with one another onto a carrier foil. Suitable plastic materials are, for example, polyvinyl chloride, polyethylene, polypropylene, acrylonitrile-butadiene-styrene polymeride or polycarbonate that can be used in compact form as well as in foamed form. Assuming that the selection of a plastic material that is suited best for a given usage as well as its processing is within the realm of expert knowledge, the usable materials and their processing do not have to be described in detail.

In FIG. 2*a* and 2*b*, the membrane thickness d and the membrane area A are shown as a function of the height h of the protuberance for a compact and for a foamed plastic material.

In FIG. 2*a*, the curve 21 of the optimal thickness d according to the invention corresponds to the cover surface of the protuberance acting as a resonance surface, as a function of the height h of the protuberance for the oscillatory form s=1 and a compact plastic PVC material. Curve 22 also shows the optimal thickness d of the same surface as a function of the height h, but for the oscillatory form s=2. Both curves apply to an optimal resonance frequency and optimal sound absorption in the frequency range $f_0 \simeq 1,000$ c/s.

Curve 23 corresponds to the optimal size A of the resonance surface according to the invention as a function of the height h of the protuberance for the oscillatory form s=1 and a compact plastic PVC material. Curve 24 also shows the optimal surface A as a function of the height h, but for the oscillatory form s=2. These two curves also apply to a resonance frequency in the range of $f_0 \simeq 1,000$ c/s.

FIG. 2*b* shows the optimal thickness d of the resonance surface according to the invention as a function of the height h of the protuberance and for the oscillatory form s=1 by means of the curve 25 as well as for the oscillatory form s=2 by means of the curve 26 for a structural element of foamed polypropylene plastic. Both curves apply to a resonance frequency or an optimal sound absorption in the frequency range $f_0 \simeq 1,600$ c/s.

In addition, curve 27 shows the optimal size A of the resonance surface according to the invention as a function of the height h of the protuberance for the oscillatory form s= 1, and curve 28 shows the identical size for the oscillatory form s=2 for a foamed polypropylene plastic. Both curves apply to a resonance frequency and an optial sound absorption in the frequency range $f_0 \simeq 1,600$ c/s.

These curves show that the optical thickness d of the resonance surface becomes smaller when the height h of the protuberance becomes larger. The curves confirm that the thickness d of the resonance surface in the range of the height h of the protuberance that is important for the practical use of the structural element, i.e., between 10 and 35 mm, is dependent the most on this height. The curves also confirm that for oscillatory forms s=2 and protuberances with heights in the indicated range of 10 to 50 mm, the optimal thickness d falls to values where the required mechanical stability of the finished structural component is no longer guaranteed.

The representation shows that the optimal size A of the resonance surface is approximately proportional to the resonance surface thickness d. The curves also show that the optimal surface A for the oscillatory form s=2 is smaller than for the oscillatory form s=1, and that the values of the thickness d and of the size A of the resonance surface that correspond to the process according to the invention are significantly under the values that were customary up to now and are listed in the initially mentioned publications.

Finally, the comparison of the curves in FIGS. 2*a* and 2*b* shows that the dependance of the thickness and the size of the resonance surface determined for an optimal sound absorption on the height of the protuberance is much higher for a resonance surface made of foamed plastic than for a resonance surface made of a compact plastic material.

FIG. 3 shows the typical course of the sound level as a function of the frequency for an internal-combustion engine (four-stroke Otto engine) having four cylinders and during idling at about 800 rpm. In this case, it is understood that the exact course of this curve is determined not only by the mentioned engine type, the number of revolutions and the load, but also by specific construction characteristics, the operating temperature and other parameters. Measurements at different engines, in the case of different operating conditions have shown, however, that the course of the curve 30 corresponds to a mean value. Curve 30 shows that the sound level is low in the case of frequencies of up to 1,000 c/s, rises with increasing frequencies, reaches the maximum value at 1,600 c/s and falls slowly up to about 2,500 c/s and rapidly at frequencies that are still higher.

FIG. 4 shows the intensity of the sound absorption as a function of the frequency of the impinging sound for three different embodiments of structural elements that absorb airborne noise. All three structural elements have truncated-pyramid-shaped protuberances that are open in the rear, as shown in FIGS. 1a and 1b. In the case of all three embodiments, the plastic foils were swaged in such a way that the lateral surfaces are inclined by about 20° with respect to the vertical line, and the protuberances in the plane of the base area have a distance of 5 mm.

The height of the protuberances and the size of the resonance surfaces is the same for all three embodiments and amounts to 30 mm or 35 cm$^2$. In the case of these embodiments, the resonance surfaces are reactangular and have an aspect ratio of about 0.8:1.

Curve 41 shows the sound absorption of a structural element made of foamed polyethylene in which the thickness of the resonance surface is 1.5 mm. This curve rises evenly from values of low sound absorption in the case of low frequencies to a maximum sound absorption corresponding to $\alpha_s \sim 0.8$ at 1,000 c/s, then falls only slightly up to frequencies of about 1,250 c/s and then up to about 1,500 c/s falls off steeply to $\alpha_s \sim 0.3$.

Curve 42 shows the sound absorption of a structural element made of compact PVC, in which the thickness of the resonance surface is 0.15 mm. The curve starts at higher frequencies than curve 41, rises steeply and, for a frequency of 1,000 c/s, reaches a relatively narrow maximum value of $\alpha_s \sim 0.9$ and subsequently falls off again steeply to $\alpha_s \sim 0.45$ at 1,500 c/s.

Curve 43 shows the sound absorption of a structural element made of foamed polypropylene in which the thickness of the resonance surfaces is 3 mm. This curve rises to frequencies of about 1,250 c/s similar to curve 41, but then continues to rise to a maximum value of more than 0.95 in the frequency range around 1,500 c/s and then falls more flatly than curves 41 and 42 and reaches a value of $\alpha_s \sim 0.5$ at a frequency of 4,000 C/S.

The shown curves demonstrate that the sound absorption of foamed plastic reaches higher values and is effective in a wider frequency range than that of compact plastic and that a structural element having protuberances dimensioned according to the invention (curve 43) has a sound absorption curve that corresponds very well to the sound level of an internal-combustion engine (FIG. 3).

Naturally, the process according to the invention and a structural element constructed according to this process can be adapted to special working conditions or usages. It was mentioned that instead of the foils used for the described embodiments, also other plastic foils having similar characteristics may be used. It is also possible to develop the structural element differently than the described simple plastic foil that is provided with protuberances. For certain usages, it may be advantageous to cover the back of the structural element with a porous sound-absorbing material or to insert into or fit onto the rear openings of the protuberances a "lid" of such a material. It is also possible to make a combined structural element from two structural elements of the described type. Of the simple structural elements that are used for this purpose, one is provided with protuberances that are slightly higher and the base area is slightly larger than in the case of the other structural element. This design of the protuberances makes it possible to place the structural elements on top of one another in such a way that only the webs of the base areas that are located between the protuberances are located on top of one another. Then the protuberances that stand on top of one another form a closed resonance space that is open in the rear, which again improves or expands the sound absorption and their frequency range. Finally, it is also possible to make a combined structural element out of more than two structural elements.

We claim:

1. A process for constructing a structural element that absorbs airborne sound and has a plurality of cup-shaped protuberances, the top surfaces of which that act as resonance surfaces are excited by impinging sound energy to perform oscillations, said sound energy being at least partially absorbed and changed into heat, characterized in that for an optimal sound absorption by means of resonant vibrations the thickness d of the resonance surfaces is developed according to the formula $$3 \cdot \left( \frac{K_1}{f_0} + \frac{K_2}{f_0^2 h} \right) \leq 4 \cdot d \leq 5 \cdot \left( \frac{K_1}{f_0} + \frac{K_2}{f_0^2 h} \right)$$

and the area size A of each resonance surface is developed according to the formula $$A = K_3 \frac{d}{f_0} \sqrt{1 + q}$$

$$\text{with } q = \frac{1}{f_0 h} \cdot \frac{K_2}{K_1}$$

in which formulas h is the height of the protuberance and $f_0$ is the resonance frequency, and $K_1$, $K_2$ and $K_3$ are constants that are dependent on the material of the structural element and on the type of vibration of the resonance surface.

2. A process according to claim 1, characterized in that for a structural element made of a compact plastic and resonance oscillations in the range of 1,000 c/s and oscillation type s=1, the value for the constant $K_1=1.1$ ms$^{-1}$, for the constant $K_2=1.6$ m$^2$s$^{-2}$ and for the constant $K_3=4.7\times10^3$ms$^{-1}$.

3. A process according to claim 1, characterized in that for a structural element made of compact plastic and resonance oscillations in the range of 1,000 c/s and oscillation type s=2 (harmonic oscillation), the value for the constant $K_1=0.12$ ms$^{-1}$, for the constant $K_2=0.17$ m$^2$s$^{-2}$, and for the constant $K_3=2.1\times10^4$ ms$^{-1}$.

4. A process according to claim 1, characterized in that for a structural element made of foamed plastic and oscillation type s=1, the value for the constant $K_1=3.2$ ms$^{-1}$, for the constant $K_2=70.6$ m$^2$s$^{-2}$, and for the constant $K_3=1.6\times10^3$ ms$^{-1}$.

5. A process according to claim 1, characterized in that for a structual element made of foamed plastic and of oscillation type s=2, the value for the constant $K_1=0.34$ ms$^{-1}$, for the constant $K_2=7.5$ m$^2$s$^{-2}$ and for the constant $K_3=7.5\times10^3$ ms$^{-1}$.

6. An airborne-sound absorbing structural element manufactued according to the process of claim 1, characterized by at least one compact or foamed plastic foil, from which the cup-shaped protuberances are shaped out in one piece.

7. A structural element according to claim 6, characterized in that two or several plastic foils with a different height and base surface of the protuberances are placed on top of one another in such a way that only the webs of the base surfaces arranged between adjacent protuberances touch one another.

8. A structural element according to claim 6, characterized in that the top surfaces or resonance surfaces of the protuberances have the shape of a rectangle, of a trapezoid, of a parallelogram, of a circle or of a regular polygon.

9. A structural element according to claim 8, characterized in that the cup-shaped protuberances taper off in the direction of the top surface.

10. A structural element according to claim 6, characterized in that the interior openings of the cup-shaped protuberances are closed off by means of a layer of porous material.

11. The use of the structural element according to claim 6 for the at least partial inner lining of the casing of a machine, particularly of an internal-combustion engine.

12. The use of the structural element according to claim 6 for the at least partial inner lining of a space.

* * * * *

UNITED STATES PATENT AND TRADEMARK OFFICE
CERTIFICATE OF CORRECTION

PATENT NO. : 4,755,416 Page 1 of 2

DATED : July 5, 1988

INVENTOR(S) : Alfred Schnedier et al.

It is certified that error appears in the above-identified patent and that said Letters Patent is hereby corrected as shown below:

In the drawings, sheet 2, Figures 2A and 2B, should be deleted to appear as shown on the attached sheet.

Signed and Sealed this

Twenty-ninth Day of November, 1988

*Attest:*

DONALD J. QUIGG

*Attesting Officer*

*Commissioner of Patents and Trademarks*